United States Patent
Thompson et al.

(10) Patent No.: US 10,395,082 B1
(45) Date of Patent: Aug. 27, 2019

(54) COVER RETENTION SYSTEM FOR DATA READER

(71) Applicant: DATALOGIC USA, INC., Eugene, OR (US)

(72) Inventors: Ryan Brandon Thompson, Eugene, OR (US); Kelvin Roland Dietz, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 16/146,903

(22) Filed: Sep. 28, 2018

(51) Int. Cl.
  *G06K 7/10* (2006.01)
  *H01R 13/506* (2006.01)

(52) U.S. Cl.
  CPC ....... *G06K 7/10881* (2013.01); *G06K 7/1098* (2013.01); *H01R 13/506* (2013.01)

(58) Field of Classification Search
  CPC . G06K 7/10881; G06K 7/1098; H01R 13/506
  See application file for complete search history.

(56) References Cited

U.S. PATENT DOCUMENTS

| 5,378,882 A | 1/1995 | Gong et al. |
| 5,898,789 A | 4/1999 | Nichols et al. |
| 6,375,487 B1 * | 4/2002 | Tennessen ......... H01R 13/5845 439/373 |
| 9,644,828 B1 * | 5/2017 | May .......................... F21V 7/00 |

FOREIGN PATENT DOCUMENTS

WO  WO 2017/095450 A1  6/2017

* cited by examiner

*Primary Examiner* — Laura A Gudorf
(74) *Attorney, Agent, or Firm* — Stoel Rives LLP

(57) ABSTRACT

Systems and methods for a data reader for retaining a component such as a cover or accessory to a data reader housing, including a first connector such as a connector socket disposed in the housing proximate a housing opening, the component being removably attached to the housing, connection snaps operable for retaining the component to the housing, a cable including a second connector adapted to be connected to the first connector, wherein retention force of the connection snaps for retaining the cover to the housing is augmented via insertion of the second connector between the connection snaps and into connection with the first connector.

13 Claims, 5 Drawing Sheets

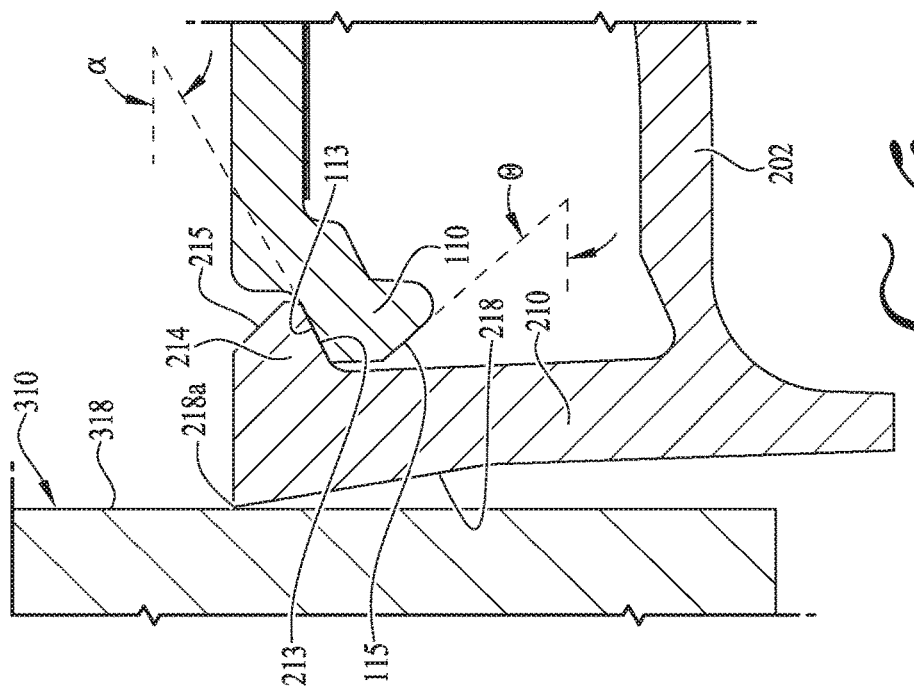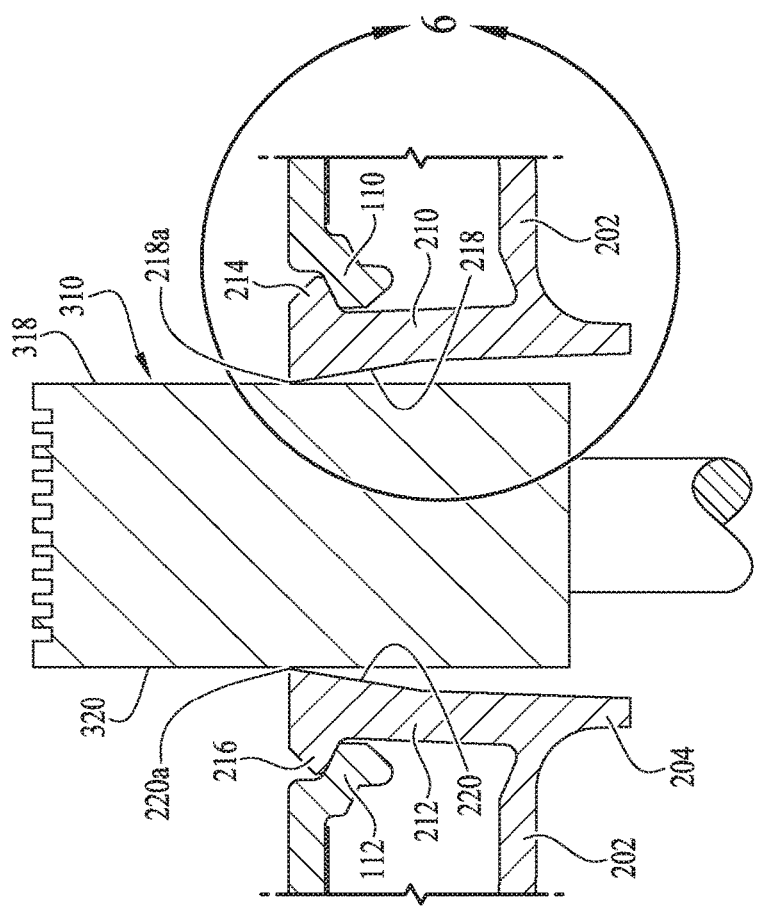

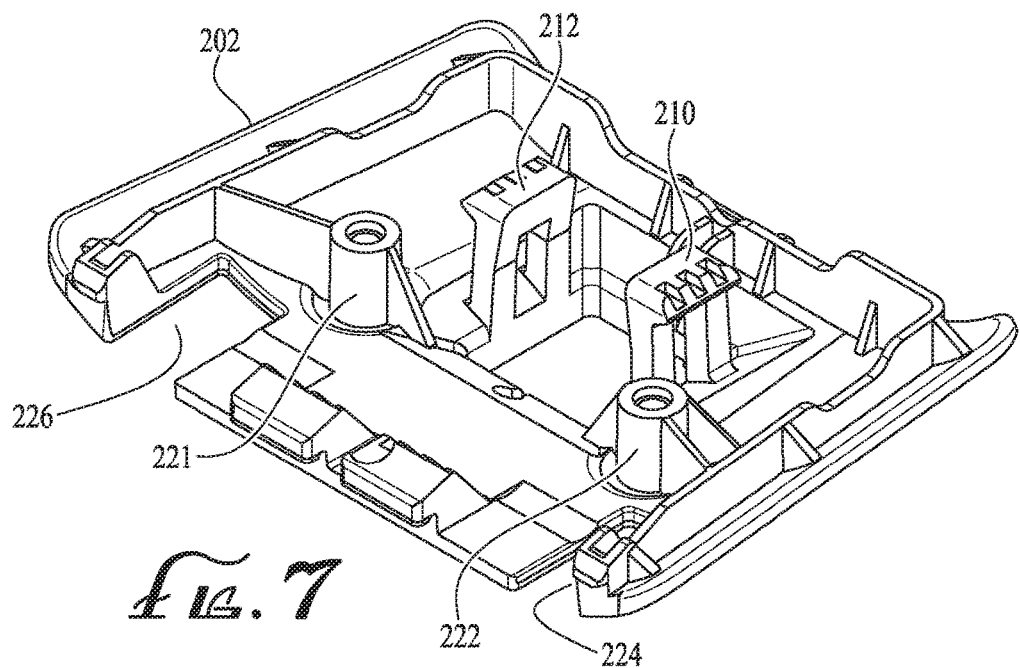
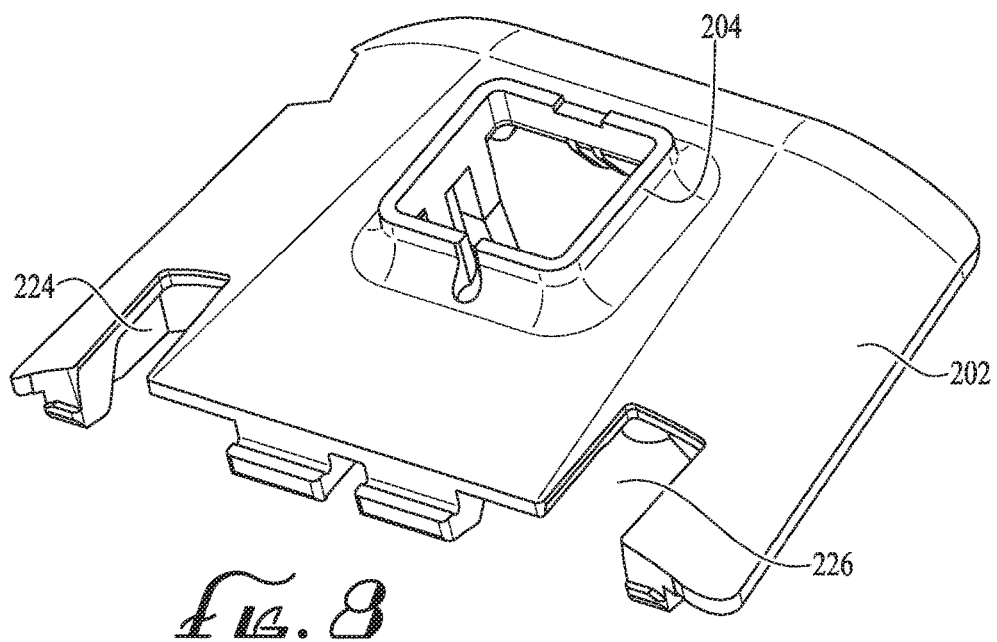

US 10,395,082 B1

COVER RETENTION SYSTEM FOR DATA READER

BACKGROUND

The field of this disclosure relates generally to data readers and systems and methods for retaining a component such as a cover, stand, accessory or the like to a data reader.

Data reading devices are used to read optical codes, capture a variety of images, and acquire data (e.g., optically, magnetically or electronically). Data reading devices are well known for reading UPC (Universal Product Code) and other types of optical codes on packages, particularly in retail stores, inventory control and package handling/shipment. One common data reader is an optical imaging reader that employs an imaging device or sensor array, such as a CCD (charge coupled device) or CMOS (complementary metal oxide semiconductor) device. Another common optical data reader is a laser-based scanner that uses a moving laser beam to sweep a laser spot across the barcode. Yet another common data reader is an electronic reader (e.g., radio frequency identification, RFID, reader) that reads electronic (e.g., RFID) tags.

These data readers generally comprise a housing and a plurality of elements disposed within the housing. Such elements may include a printed circuit board (PCB) on which various electronic components (e.g., processor, light source, detector/imager, electrical connectors) are mounted, or other optical elements. The data reader may include a connector cable for providing power and/or communication to an external device/source.

Further, the data reader may include a cover or side wall section that may be removed from the reader housing to provide access to internal components. Data readers may have need for connecting a cover or attaching various accessories such as a stand. The present inventors have recognized that these covers and accessories may preferably be readily removable, but that they also may need to have sure connection/attachment.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

FIG. 5 is a view of a portion of FIG. 4 of the cable connection section and cover retention system of the data reader system, on an enlarged scale.

FIG. 6 is a view of a portion of FIG. 5 of the cover retention system, on an enlarged scale.

FIG. 7 is a bottom isometric view of the cover from the data reader of FIG. 3, on an enlarged scale.

FIG. 8 is a top isometric view of the cover of FIG. 7.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Embodiments herein are described with respect to data readers. For the purposes of the present disclosure, some of the embodiments may be described as data readers which may comprise optical readers (e.g., imaging readers, barcode scanners), electronic (e.g., RFID) readers, or the like. Suitable uses for data readers with the characteristics and features described are applicable, for example, in retail applications, an industrial location such as a parcel distribution (e.g., postal, shipping) station or an inventory or warehouse application.

Figure 1:
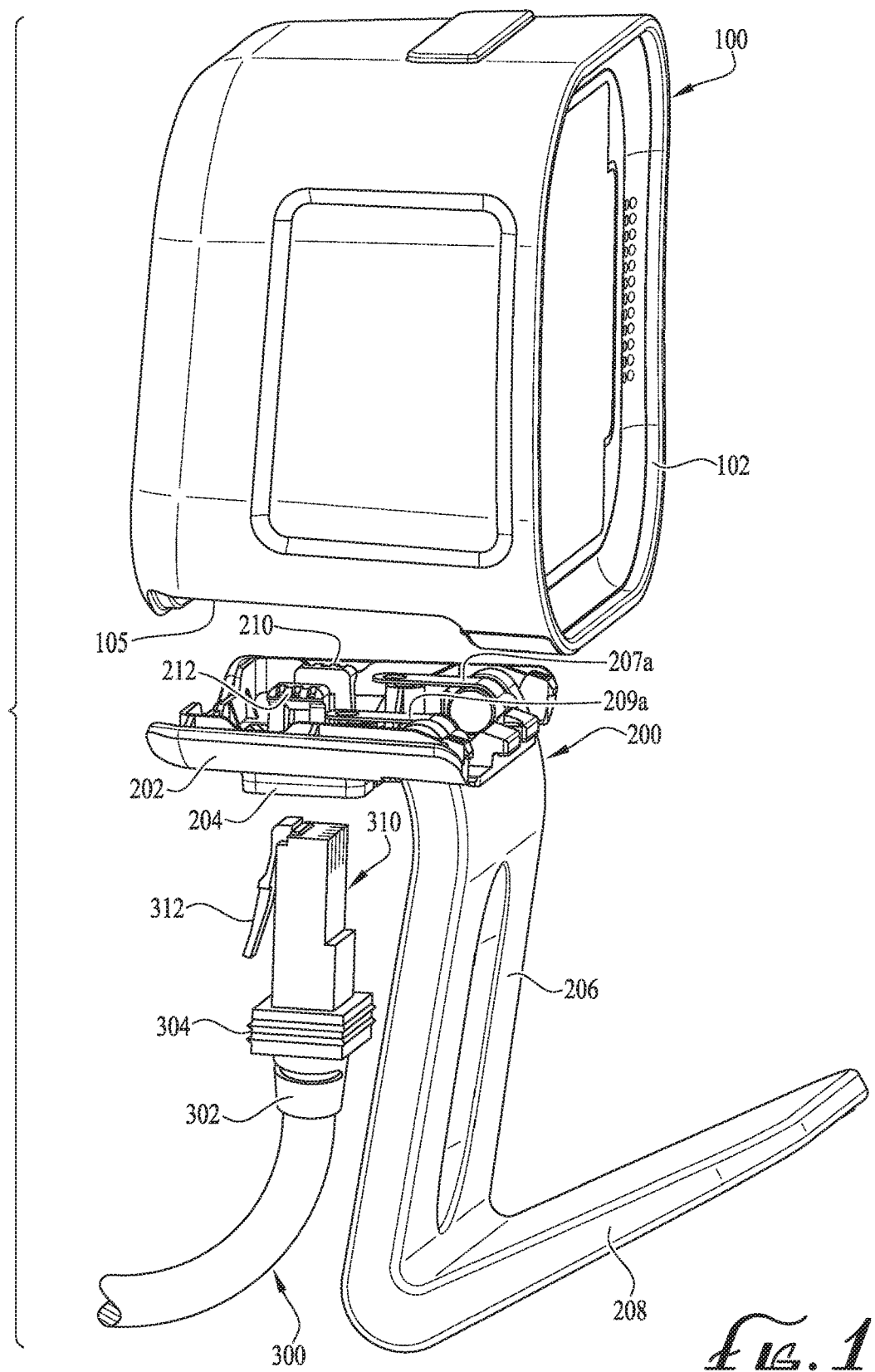
FIG. 1 is an exploded top front isometric view of a data reader system, with a removable cover/stand and connector cable, according to an embodiment.
Figure 2:
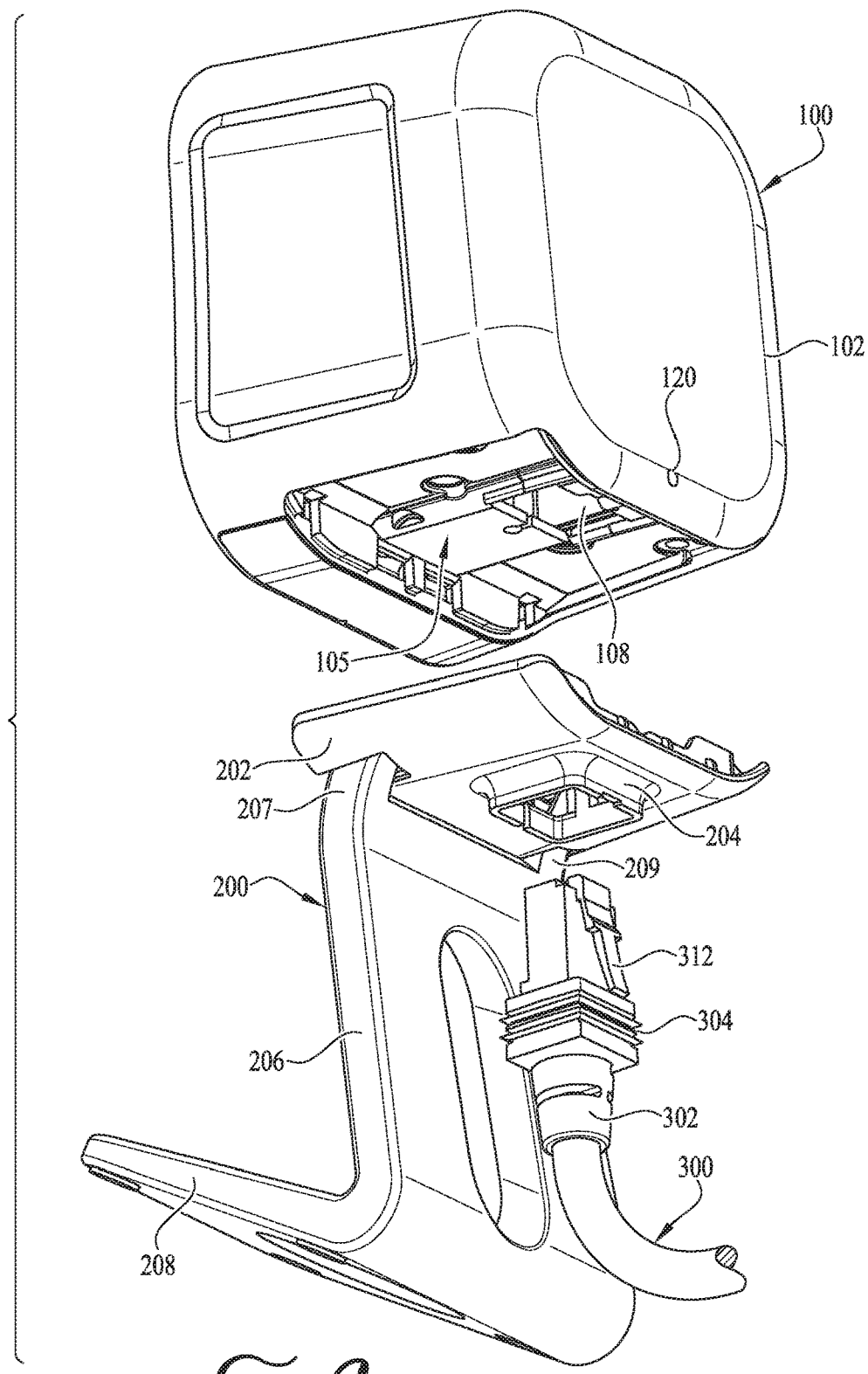
FIG. 2 is an exploded bottom rear isometric view of the data reader system of FIG. 1.

FIGS. 1-2 illustrate an exploded view of a data reader 100, a cover/accessory 200 and an interface connector cable 300. The data reader 100 includes a housing or enclosure 102 with a cavity or opening 105 on the bottom side of the housing 102. The cavity/opening 105 may be alternately disclosed on any suitable side of the housing 102. Within the cavity 105 is disposed a female connector socket 108 for accepting the male connector plug 310 of the connector cable 300, the connector plug 310 adapted to plug into the connector socket 108. The connector socket 108 may be mounted to a PCB (printed circuit board) disposed within the housing 102.

The cover/accessory 200 includes a cover section 202, an optional stand section 206 removably attached to the cover section 202 and a stand base 208 at the bottom of the stand section 206. The cover section 202 is removably attached to the data reader housing 102, covering the opening 105. The cover section 202 includes connection snaps 210, 212 which engage with retainer shoulders 110, 112 of the housing 102 for securing the cover section 202 in place over opening 105. Details of the cover securing elements will be described below with respect to FIGS. 5-8.

FIGS. 7-8 illustrate details of the cover section 202. FIG. 7 is a top isometric view of the cover section 202 showing internal components including snaps 210, 212, screw bosses 221, 222 and stand arm openings 224, 226. The openings 224, 226 accept insertion of the stand arms 207, 209 of the stand section 206. The arms 207, 209 (that include hinges 207a, 209a) extend inwardly into the cover section 202 for permitting the arms 207, 209 to be screwed down (via screws not shown) into the respective screw bosses 221, 222 when the stand section 206 is assembled to the cover section 202. The cover section 202 includes a cable socket 204 for guiding the connector plug 310 for insertion through the cover section 202 into the opening 105 for connection to the cable connector socket 108. The cable 300 includes a male connector plug 310, strain relief 302 and sealing collar 304. The strain relief 302 and the sealing collar 304 may be formed by overmolding or other suitable process. The connector plug 310 may include a release clip 312 for releasably securing the connector plug 310 to the cable connector socket 108.

The cable connector plug 310 is an example connector type shown as an interface cable type RJ10 modular interface connector, but other types of connectors or cables may be utilized including, but not limited to other types of modular jacks, other types of RJ (Registered Jack) connectors, power connector, barrel connector, plug and socket type connectors, serial connector, USB (Universal Serial Bus) connectors, DB (D-subminiature) style connector, audio connector, HDMI (High-Definition Multimedia Interface) connector, or other suitable type of connector. A suitable connector may include an active release mechanism (such as the release clip 312 of the RJ-type modular connector illustrated), or other suitable active release mechanisms (such as the screw-type connector of a DB style connector). Alternately, the connector plug may be made without an active release mechanism such as in the friction connection of a USB style connector.

Though the embodiment of FIGS. 1-6 illustrates a female connector socket disposed in the data reader housing for accepting a male connector plug, a reverse configuration may be employed wherein a male connector plug is disposed in the data reader housing for accepting a female connector socket.

Figure 4:
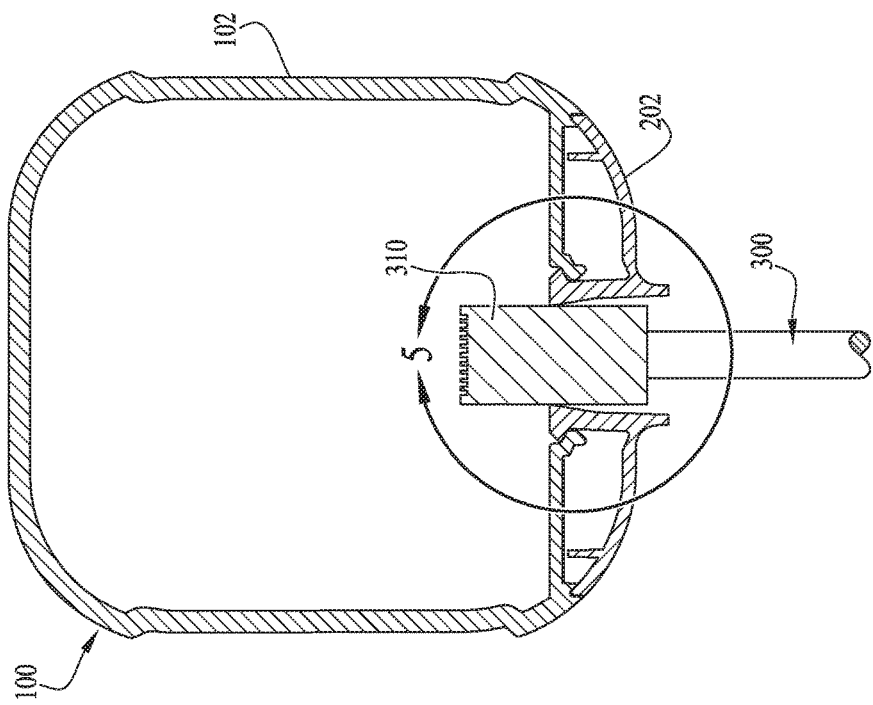
FIG. 4 is a cross-sectional view of the data reader system of FIG. 3 taken along lines 4-4.
Figure 3:
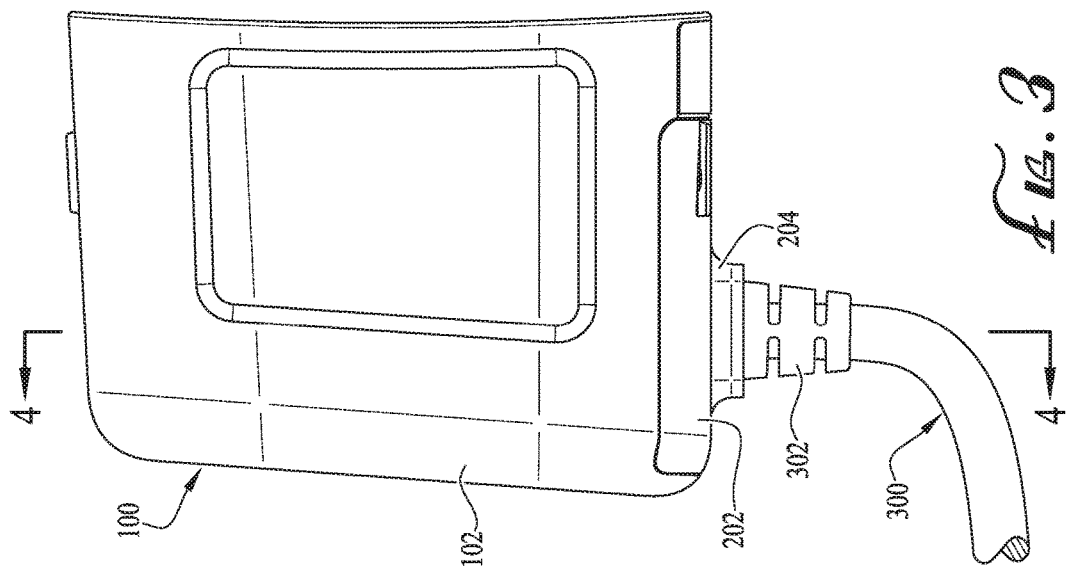
FIG. 3 is a side elevation view of the data reader system of FIG. 1 with a bottom cover and connector cable in place, without the stand section.

FIGS. 3-6 illustrate details of the cable connector plug 310 being inserted and attached to the data reader 100. FIG. 3 illustrates the cover section 202 attached to the data reader housing 102 with the stand section 206 of FIGS. 1-2 being removed. In an example assembly method, the cover section 202 is first inserted into position over the opening 105. While being inserted, the snaps 210, 212 are retracted, bending inwardly, so that when inserted, they move past the shoulders 110, 112 and into the locking position as shown in FIGS. 4-6.

FIG. 6 illustrates details of the snap 210 and shoulder 110. The configuration and operation of the snap 212 and shoulder 112 on the other side are the same. The shoulder 110 includes an angled lower surface 115, shown with an angle θ to the horizontal. The upper section 214 of the snap 210 includes a lateral extension or laterally extending latch portion with a similar angled upper surface 215, also at the angle θ to the horizontal. The angled upper surface 215 of the snap upper section 214 engages the angled lower surface 115 of the shoulder 110 when the snap 210 is inserted into the opening 105. Due to the contact angle θ, the surface 215 simultaneously slides upwardly and inwardly along the surface 115 thereby causing the snap upper section 214 to move inwardly, bending the snap 210, (the snap 210 being formed of a flexible material such as a suitable plastic) thus allowing the snap upper section 214 to pass the shoulder section 110, and once clear, retract back into position with the snap upper section 214 above the shoulder section 110 as shown in FIGS. 5-6. The angle θ will affect the amount of insertion force needed to defeat the snap bending during insertion of the bottom cover. The angle θ may be on the order of 45° or other suitable discrete angle to affect the desired insertion force while permitting the engaging surfaces 115, 215 to slide against each other thereby bending the arm portion of the snap 210 inwardly.

The upper section 214 of the snap 210 also has an angled lower surface 213 disposed at an angle α to the horizontal that engages against a similar angled upper surface 113 at the top of the shoulder section 110, the angled surface 113 also being disposed at an angle α to the horizontal. The angle α of mating entities 113 and 213 affects the amount of removal force needed to defeat the connection snap (when the connector plug 310 is not engaged therebetween) during removal of the cover. In this design α may be on the order of 26° or other suitable discrete angle to provide the desired removal force while permitting the engaging surfaces 113, 213 to slide against each other thereby bending the arm portion of the snap 218 inwardly. It may be desirable to have a higher removal force than insertion force from the same connection snap stiffness and engagement travel, thus angle α may be set at a smaller angle than that of angle θ.

When the cover section 202 is inserted into the opening 105 and the snaps 210, 212 are disposed with the snap upper sections 214, 216 in the locking position with respect to the shoulders 110, 112, the cable connector plug 310 may then be inserted between the snaps 210, 212. The snaps 210, 212 may have inwardly angled inner surfaces 218, 220 for accommodating and guiding insertion of the connector plug 310. The angled surfaces 218, 220 also allow space for easy blind insertion of connector plug 310 into the cable opening, but then allow these inward facing surfaces 218, 220 of snaps 210, 212 to engage with the outward facing side surfaces 318, 320.

The inward facing surfaces 218, 220 (which culminate at engagement points 218a, 220a) of snaps 210, 212 engage with outward facing surfaces 318, 320 of connector plug 310. This engagement prevents or inhibits the inward movement of the snap upper sections 214, 216 thereby preventing snaps 210, 212 from bending and converting them into tensile members between the now anchored snap upper sections and the bottom cover 202.

Once inserted in the position and plugged into the female connector socket 108, the head of the connector plug 310 has its lateral side surfaces 318, 320 engaging against the respective upper sections 214, 216 of the snaps 210, 212. Thus with the connector plug 310 in position as shown in FIGS. 4-6, the snap upper sections 214, 216 are retained in place against the shoulders 110, 112, thereby providing a mechanical interlock that inhibits unintentional removal. Thus, when plugged in, the head of the connector plug 310 is located between the connection snaps 210, 212, the snap upper sections 214, 216 occupying the space needed to retract from their engaged positions. Thus the snaps 210, 212 are prevented from disengaging while the connector plug 310 is plugged in.

With the snaps in the locked position, the distance between inward facing snap surfaces 218, 220 is such that the connector plug 310 may be easily inserted with minimal to no interference. The engagement points 218a, 220a of inward facing snap surfaces 218, 220 allow for a nominal line-to-line fit with connector plug 310 since these engagement points may easily crush a small amount to accommodate varying part tolerances, thus acting as crush ribs.

To disengage the cover 202 from the housing 102, first, the connector plug 310 is disengaged from the connector socket 108, and removed out from between the snaps 210, 212. Then the cover 202 is merely pulled downwardly whereby (with the connector plug 310 no longer in place between the snaps 210, 212) the surface 213 slides downwardly along the surface 113 thereby causing the snap 210 to bend inwardly allowing the snap upper section 214 to pass the shoulder section 110 thereby releasing the cover 202. Thus the connection snaps 210, 212 comprise flexible elements that (a) bend to an opening position to permit the cover 202 to be moved into position for attachment to the housing 102 and (b) retract once the cover 202 is in the attachment position, wherein when the connector plug 310 is inserted into the connector socket 108, the connector plug 310 is disposed between the connection snaps 210, 212 for preventing the connection snaps 210, 212 from bending inwardly to the open position thereby augmenting retention force of the connection snaps 210, 212 for retaining the cover 202 to the housing 102.

Alternately, the resting position of the connection snaps 210, 212 may be in non-engaging position relative to the shoulders 110, 112, which may require no insertion force for the cover, wherein action of insertion of the connector plug 310 would be operative to move the snaps into engaging position relative to the shoulders 110,112.

The snaps 210, 212 in one embodiment as illustrated in FIGS. 3-7 each comprises a flexible (e.g., plastic) arm that bends as described above. Other configurations for the snaps may be employed, for example a bending or pivoting (e.g., hinged) arm with or without a spring combination, or a living hinge configuration.

The cable 300 is illustrated with an RJ type modular connector plug 310 with an optional sealing collar 304 that inserts and relatively mates with the cable guide 204 of the cover section 202. In order to release the connector plug 310 from the cable connector socket 108, the release clip 312 must be disengaged by being pressed inwardly. The release clip 312 is disengaged by inserting an unfolded paper clip or other suitable tool through cable release slot 120 in housing 102 as shown in FIG. 2.

The connector system ensures that the cover/stand assembly will remain connected throughout a dynamic event such as a floor drop, keeping the unit together and allowing the data reader to be readily usable after drop. Moreover, since the cover remains connected during drop, it can be relied upon to provide support to the interface connector, preventing damage to both the cable and the data reader.

In combination with the connector system described herein, screws may additionally be used to retain the cover, but screws may require a tool to remove and may not be cosmetically appealing. Additionally, screws may require more costly machine screw threaded inserts in the plastic part in addition to the added cost of the screws themselves.

The retention system described herein may be suitable for retaining a component such as a cover or side wall or stand/accessory element as shown, but may also be useful to retain other components (parts or accessories) of a data reader such as another type of stand or riser, table mount, cosmetic skirt/cover, enclosure seal, water deflector shield, cable routing attachment, cable strain relief attachment, or cable retention device.

The cover retention system described herein may be utilized with a wire/cable interconnect, with or without connector termination and is useful to augment the retention force of a mechanically interlocking mechanism when the connector plug is in position in the connector socket. In the illustrated embodiment, the connection snaps utilize the lead in and lead out angles (e and a) for allowing insertion and removal of the cover. Alternately the snaps may be configured without the lead in and lead out angles by providing a manual release mechanism, such as a pinching mechanism whereby the operator may squeeze the snaps together for enabling insertion and/or release.

In one embodiment, the data reader system comprises a data reader housing 102 comprising side walls enclosing an interior, one of the side walls formed with an opening 105; a first connector 108 disposed in the housing 102; a cover 202 removably attached to the housing 102 over the opening 105; connection snaps 210, 212 operable for retaining the cover 202 to the housing 102; and a cable 300 including a second connector 310 adapted to be connected to the first connector 108, wherein retention force of the connection snaps 210, 212 for retaining the cover 202 to the housing 102 is augmented via insertion of the second connector 310 between the connection snaps 210, 212 and into connection with the first connector 108.

In one method of securing a component on a data reader, the data reader having a data reader housing 102 with an opening 105, comprising the steps of (a) mounting a connector socket 108 in or on the data reader housing 102 proximate the opening 105; (b) installing a component (e.g., cover 202) over the opening of the data reader housing; (c) providing a connection mechanism (e.g., connection snaps 210, 212 and shoulders 110, 112) for releasably connecting the component to the data reader housing; (d) augmenting retention force of the connection mechanism (e.g., of the connection snaps 210, 212) via insertion of a connector plug 310 into the connector socket 108 (whereby the connector plug is disposed between the connection snaps 210, 212).

Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A data reader system comprising
a data reader housing comprising side walls enclosing an interior, one of the side walls formed with an opening;
a first connector disposed in the housing;
a cover removably attached to the housing over the opening;
connection snaps operable for retaining the cover to the housing;
a cable including a second connector adapted to be connected to the first connector,
wherein retention force of the connection snaps for retaining the cover to the housing is augmented via insertion of the second connector between the connection snaps and into connection with the first connector.

2. A data reader system according to claim 1 wherein the first connector comprises a connector socket and the second connector comprises a connector plug operable for plugging into the connector socket.

3. A data reader system according to claim 2 wherein the connector plug is selected from the group consisting of: modular jack, RJ connectors, power connector, barrel connector, plug type connectors, serial connector, USB connectors, DB style connector, HDMI connector, or audio connector.

4. A data reader system according to claim 2 wherein the connection snaps comprise flexible elements that (a) bend to an opening position to permit the cover to be moved into position for attachment to the housing and (b) retract once the cover is in the attachment position, wherein when the connector plug is plugged into the connector socket, the connector plug is disposed between the connection snaps for preventing the connection snaps from bending to the open position thereby augmenting retention force of the connection snaps for retaining the cover to the housing.

5. A data reader system according to claim 2 wherein the connector plug comprises a modular connector including a release clip for releasably securing the connector plug into the connector socket.

6. A data reader configured for connection to a connector cable having a connector plug, the data reader comprising:
a housing comprising side walls enclosing an interior;

a connector socket disposed in or on the housing;

a component removably attached to the housing;

connection snaps for securing the component to the housing, wherein the connection snaps are operable (a) to bend or pivot to an open position to permit the component to be moved into position for attachment to the housing and (b) to retract once the component is in the position for attachment, wherein when the connector plug is inserted into the connector socket, the connector plug is disposed between the connection snaps for preventing the connection snaps from bending or pivoting to an open position thereby augmenting retention force of the connection snaps for securing the component to the housing.

7. A data reader according to claim 6 wherein the connector plug is selected from the group consisting of: modular jack, RJ connectors, power connector, barrel connector, plug type connectors, serial connector, USB connectors, DB style connector, HDMI connector, or audio connector.

8. A data reader according to claim 6 wherein the component is selected from the group consisting of: cover, side wall, stand, accessory element, riser, table mount, cosmetic skirt/cover, enclosure seal, water deflector shield, cable routing attachment, cable strain relief attachment, or cable retention device.

9. A data reader according to claim 6 wherein the connection snaps comprise a pair of first and second flexible plastic arms, wherein each of the arms comprises an upper section with a laterally extending latch portion that extends over and engages a shoulder section of the housing when the connection snap is in position for attachment.

10. A data reader according to claim 9 wherein the shoulder section of the housing comprises an angled upper surface at a discrete angle θ to the horizontal and the laterally extending latch portion of the connection snap comprises an angled lower surface at a discrete angle θ to the horizontal that engages the angled upper surface of the shoulder section.

11. A data reader according to claim 9 wherein the shoulder section of the housing comprises an angled lower surface at a discrete angle α to the horizontal and the laterally extending latch portion of the connection snap comprises an angled upper surface at a discrete angle α to the horizontal that engages the angled lower surface of the shoulder section as the component is moved into position for attachment to the housing.

12. A method for securing a component on a data reader, the data reader having a data reader housing with an opening, comprising the steps of mounting a connector socket in or on the data reader housing proximate the opening;

installing a component over the opening of the data reader housing;

providing a connection mechanism for releasably connecting the component to the data reader housing;

augmenting retention force of the connection mechanism via insertion of a connector plug into the connector socket.

13. A method according to claim 12 wherein providing a connection mechanism comprises securing the component to the housing via connection snaps, wherein the connection snaps are operable (a) to bend or pivot to an open position to permit the component to be moved into position for attachment to the housing and (b) to retract once the component is in the attached position, wherein when the connector plug is inserted into the connector socket, the connector plug is disposed between the connection snaps for preventing the connection snaps from bending or pivoting to the open position thereby augmenting retention force of the connection snaps for retaining the cover to the housing.

* * * * *